(12) United States Patent
Strashny et al.

(10) Patent No.: US 10,406,859 B2
(45) Date of Patent: Sep. 10, 2019

(54) TYRE APPARATUS

(71) Applicants: Caterpillar Inc., Peoria, IL (US); Igor Strashny, Wansford, Peterburgh, Cambridgeshire (GB); Paul Moore, Peterburgh (GB)

(72) Inventors: Igor Strashny, Peterburgh (GB); Paul Moore, Peterburgh (GB)

(73) Assignee: Perkins Engines Company Limited, Peterborough (GB)

( * ) Notice: Subject to any disclaimer, the term of this patent is extended or adjusted under 35 U.S.C. 154(b) by 337 days.

(21) Appl. No.: 15/110,441

(22) PCT Filed: Nov. 17, 2014

(86) PCT No.: PCT/GB2014/053395
§ 371 (c)(1),
(2) Date: Jul. 8, 2016

(87) PCT Pub. No.: WO2015/104528
PCT Pub. Date: Jul. 16, 2015

(65) Prior Publication Data
US 2016/0332486 A1    Nov. 17, 2016

(30) Foreign Application Priority Data
Jan. 10, 2014    (GB) .................................. 1400403.0

(51) Int. Cl.
*B60C 5/22* (2006.01)
*B60C 17/01* (2006.01)
*B60C 23/00* (2006.01)

(52) U.S. Cl.
CPC ............... *B60C 5/22* (2013.01); *B60C 17/01* (2013.01); *B60C 23/004* (2013.01); *B60C 2200/06* (2013.01)

(58) Field of Classification Search
CPC .......... B60C 5/22; B60C 17/01; B60C 23/00; B60C 23/001; B60C 23/004; B60C 23/12; B60C 29/007
See application file for complete search history.

(56) References Cited

U.S. PATENT DOCUMENTS 2,731,062 A  *  1/1956  Coben .................... B60C 17/01
                                                    152/341.1
2,905,221 A  *  9/1959  Nonnamaker ........ B60C 29/007
                                                    137/510
(Continued)

FOREIGN PATENT DOCUMENTS

CN         200945805              9/2007
DE         4014379 A1             11/1991
(Continued)

OTHER PUBLICATIONS

International Search Report Application No. PCT/GB2014/053395 dated Jan. 27, 2015.
(Continued)

*Primary Examiner* — Kip T Kotter
(74) *Attorney, Agent, or Firm* — Murgitroyd & Company Miller, Matthias & Hull

(57) ABSTRACT

A tire apparatus is provided, the apparatus including a tire body for attachment to a wheel rim to define a first inflatable volume. An inner chamber defines a second inflatable volume which is located within the first inflatable volume of the tire body. A first fluid communication path is provided between the first and second inflatable volumes and a second fluid communication path is provided between the first inflatable volume and the atmosphere. A first valve opens and closes the first fluid communication path, and a second valve opens and closes the second fluid communication path. The tensile strength and pressure-containing capacity of the material structure of the second inflatable volume is greater than that of the tire first inflatable volume. A first fluid pressure within the first inflatable volume of the tire body is optimisable by opening the first valve to allow pressure transfer from the second inflatable volume into the tire body, and/or opening the second valve to allow pressure (Continued)

to vent from the tire body to atmosphere. A vehicle wheel and active tire pressure control system incorporating the tire apparatus are also provided.

11 Claims, 4 Drawing Sheets

(56) References Cited

U.S. PATENT DOCUMENTS

| | | | |
|---|---|---|---|
| 5,301,729 | A | 4/1994 | Blair |
| 5,538,061 | A | 7/1996 | Blair |
| 5,629,873 | A | 5/1997 | Mittal et al. |
| 5,647,927 | A | 7/1997 | Mason |
| 6,098,682 | A | 8/2000 | Kis |
| 6,144,295 | A * | 11/2000 | Adams ............... B60C 23/003 137/224 |
| 6,594,566 | B1 | 7/2003 | Skoff |
| 7,066,226 | B1 | 6/2006 | Fiore |
| 7,219,540 | B2 * | 5/2007 | Nordhoff ............. B60C 23/003 152/416 |
| 2002/0059972 | A1 | 5/2002 | Rheinhardt |
| 2003/0230342 | A1 | 12/2003 | Skoff et al. |
| 2004/0003865 | A1 | 1/2004 | Skoff |
| 2005/0080777 | A1 | 4/2005 | Champeau |
| 2007/0068238 | A1 | 3/2007 | Wendte |
| 2008/0066533 | A1 | 3/2008 | Beverly et al. |
| 2008/0087361 | A1 | 4/2008 | Stommel |
| 2009/0020201 | A1 * | 1/2009 | Ohara ..................... B60C 5/22 152/340.1 |
| 2009/0038725 | A1 | 2/2009 | Bibas |
| 2010/0023214 | A1 | 1/2010 | Horiguchi et al. |
| 2010/0235044 | A1 | 9/2010 | Sawada et al. |
| 2010/0300591 | A1 * | 12/2010 | Rheinhardt ........... B60C 23/004 152/427 |
| 2012/0221196 | A1 | 8/2012 | Seymour et al. |
| 2013/0180641 | A1 | 7/2013 | French |

FOREIGN PATENT DOCUMENTS

| | | | |
|---|---|---|---|
| DE | 19959695 | | 7/2001 |
| DE | 19959695 A1 | | 7/2001 |
| DE | 102006039011 A1 | | 2/2008 |
| DE | 102007035934 A1 | | 4/2008 |
| DE | 202011051292 U1 | | 9/2011 |
| DE | 202011051293 U1 | | 9/2011 |
| DE | 102010040539 A1 | | 3/2012 |
| EP | 0504913 A1 | | 9/1992 |
| EP | 1000777 A2 * | 5/2000 | ........... B60C 23/004 |
| EP | 1044828 A1 | | 10/2000 |
| EP | 1493599 A1 | | 1/2005 |
| EP | 2078624 A1 | | 7/2009 |
| ES | 2427490 | | 3/2012 |
| ES | 2427490 | | 10/2013 |
| FR | 2 969 534 A1 | | 6/2012 |
| JP | 58149806 A * | 9/1983 | ............... B60C 5/20 |
| JP | 2006015915 A | | 1/2006 |
| WO | WO-2006/060966 A1 | | 10/2005 |
| WO | 2006060966 | | 6/2006 |

OTHER PUBLICATIONS

Search Report for related Great Britain Application No. GB1400403.0; report dated Jul. 29, 12014.

* cited by examiner

TYRE APPARATUS

CROSS-REFERENCE TO RELATED APPLICATION

This Application is a 35 USC § 371 US National Stage filing of International Application No. PCT/GB2014/053395 filed on Nov. 17, 2014, and claims priority under the Paris Convention to Great Britain Patent Application No. GB 1400403.0 filed on Jan. 10, 2014.

FIELD OF THE DISCLOSURE

The present disclosure relates generally to a tyre apparatus for heavy duty vehicles (HDVs). More particularly, the present disclosure relates to a wheel-mountable tyre comprising an inner chamber which is inflatable independently of an outer ground-engageable tyre body. A vehicle wheel incorporating the tyre apparatus; and an active tyre pressure control system incorporating the vehicle wheel are also disclosed.

BACKGROUND OF THE DISCLOSURE

Vehicle manufacturers continually invest in research and development efforts aimed at improving the fuel efficiency of road vehicles. This is particularly important in the road haulage industry where fuel represents a significant percentage of HGV operating costs. Fuel efficiency is dependent on numerous different factors other than the inherent efficiency of engines. For example, aerodynamic styling features such as cab roof deflectors, air dams, side skirts etc. help to reduce aerodynamic drag with consequent improvements to overall fuel efficiency.

Another key aspect of the fuel efficiency of a vehicle stems from the rolling resistance of its tyres as exemplified in FIG. 1. Different tyre characteristics can influence their rolling resistance to varying degrees such as tread thickness, tyre width, polymer composition, tyre temperature, and tyre pressures. Of these, only the latter is under the direct control of a vehicle driver at any given time.

Tyre inflation systems which employ so called "self-inflating" tyres are known. Such systems allow the adjustment of air pressure within each tyre to be matched with external conditions to thereby improve performance and/or tyre tread life and/or maneuverability on different road surface types.

For example, the Spicer® Tire Pressure Control System (TPCS) by Dana Commercial Vehicle Driveline Technologies provides a driver with six pre-defined pressure settings which can be selected depending upon ground terrain and vehicle load. An alternative solution is the SYEGON® Central Tire Inflation System (CTIS) by Nexter Mechanics. It provides for automatic adjustment of tyre pressure dependent upon vehicle speed, vehicle load (three discrete levels) and terrain type (four types). The Spicer® and SYEGON® systems share a military heritage and are high-cost options which provide only a limited number of pre-set pressure adjustments.

It is an aim of the present disclosure to overcome, or at least ameliorate, one or more disadvantages associated with the prior art.

SUMMARY OF THE DISCLOSURE

According to a first aspect of the present disclosure there is provided a tyre apparatus including:

a tyre body for attachment to a wheel rim to define a first inflatable volume;

an inner chamber defining a second inflatable volume located within the first inflatable volume of the tyre body;

a first fluid communication path between the first and second inflatable volumes;

a second fluid communication path between the first inflatable volume and the atmosphere;

a first valve for opening and closing the first fluid communication path; and a second valve for opening and closing the second fluid communication path;

wherein the tensile strength and pressure-containing capacity of the material structure of the second inflatable volume is greater than that of the tyre first inflatable volume; and wherein a first fluid pressure within the first inflatable volume of the tyre body is optimisable by:

(i) opening the first valve to allow pressure transfer from the second inflatable volume into the tyre body; and/or (ii) opening the second valve to allow pressure to vent from the tyre body to atmosphere.

In one non-limiting embodiment, in view of its greater tensile strength, the second inflatable volume of the inner chamber is capable of being pressurised to at least ten times that of the first inflatable volume of the tyre body. For example, the first inflatable volume may be inflated to a pressure of approximately 7 bar (700 kPa) whilst the second inflatable volume may be inflated to a pressure of approximately 70 bar (7000 kPa).

The inner chamber may be constructed from an aromatic polyamide (aramid) fibre such as Kevlar® fibre. The physical properties of Kevlar® fibre make it a particularly suitable material choice for the inner chamber. In particular, Kevlar® fibre expands very little under pressure and has a tensile strength which is at least two orders of magnitude greater than that of natural rubber.

The inner chamber (second inflatable volume) may have a maximum volume which is expandable to fill at least 50% of the total volume of the tyre body (first inflatable volume). Particular ranges of first/second inflatable volume ratios may find particular application in the tyre apparatus of different vehicle types as described below.

The tyre body may include a ground-engageable tread portion and a pair of sidewall portions extending from either side of the tread portion. Each sidewall portion may terminate in a bead portion at its end remote from the tread portion. The bead portions are engageable with a wheel rim. Once mounted on a wheel rim, the annular first inflatable volume is defined between the inner surfaces of the sidewall and tread portions of the tyre body and the inner surface of the wheel rim extending between the bead portions, respectively. Once inflated, the inner chamber may form an interference fit with the wheel rim.

According to a second aspect of the present disclosure there is provided a vehicle wheel including a wheel rim and a tyre apparatus according to the first aspect, mounted thereto.

In view of its superior structural qualities, the inner chamber may provide run-flat protection in the event of a sudden pressure failure in the tyre body.

According to a third aspect of the present disclosure there is provided an active tyre pressure control system for controlling the rolling resistance of a vehicle having one or more vehicle wheels according to the second aspect, comprising:

a vehicle-mounted control system for generating a pressure transfer output signal; and at least one input signal receivable by the control system based on one or more external parameters;

wherein the control system algorithmically processes the input signals by software means to determine an optimum inflation pressure for the tyre body within each vehicle wheel, and sends appropriate pressure transfer output signals to open the corresponding first and/or second valves until optimum inflation pressures are reached within each tyre body.

The inflation device may be operable whilst the vehicle wheels are in motion thus providing dynamic, real-time optimisation of tyre pressure matched to external parameters. The external parameters may include one or more of: vehicle speed; vehicle load; vehicle configuration; ground surface parameters; tyre parameters; GPS information; GSM information on current weather conditions; and temporal characteristics relating to each vehicle wheel such as time since last tyre change (and hence predicted tyre wear) and/or historical air leakage rates.

Other features and aspects of this disclosure will be apparent from the following description and the accompanying drawings.

DETAILED DESCRIPTION OF THE DISCLOSURE

Figure 1:
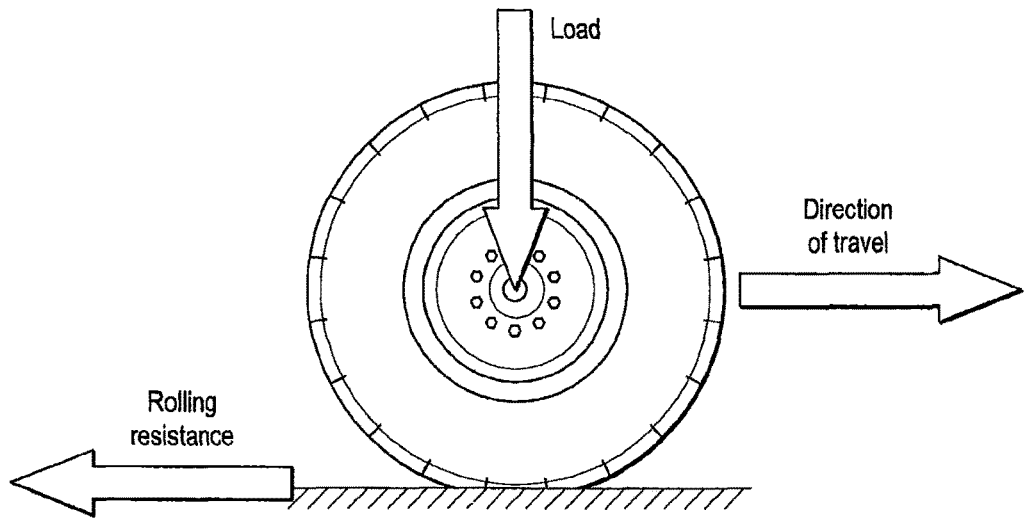
FIG. 1 is a schematic representation of a vehicle wheel exemplifying the relationship between rolling resistance, load and direction of travel.
Figure 2A:
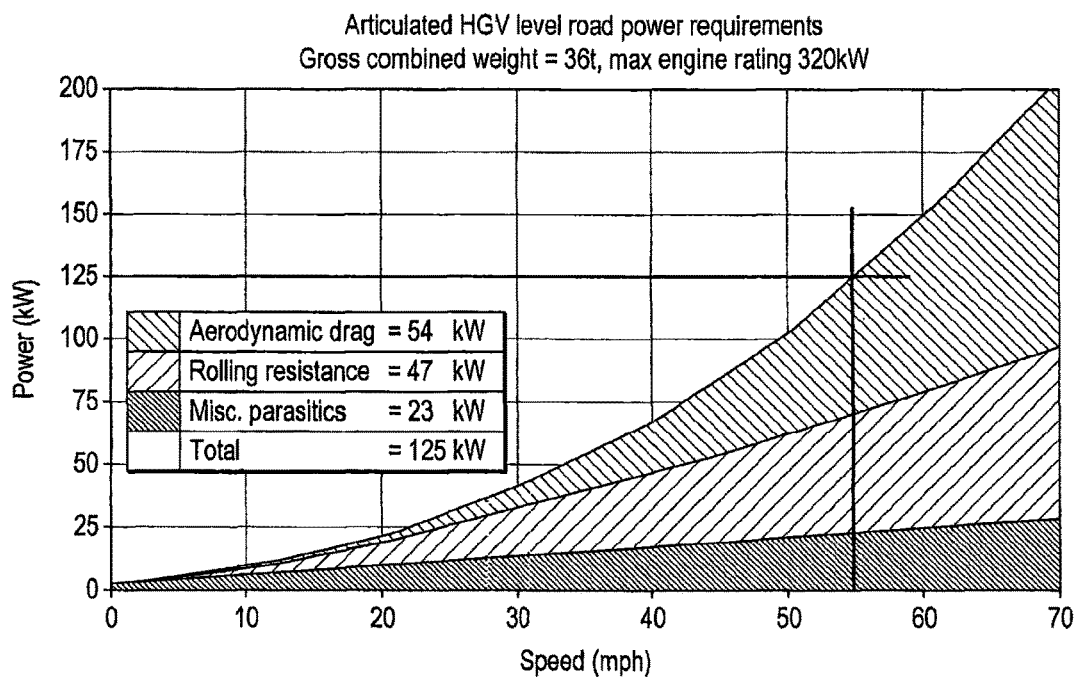
FIG. 2a is a graph showing the typical proportion of articulated HGV level road power requirements taken up by rolling resistance as a function of vehicle speed.
Figure 2B:
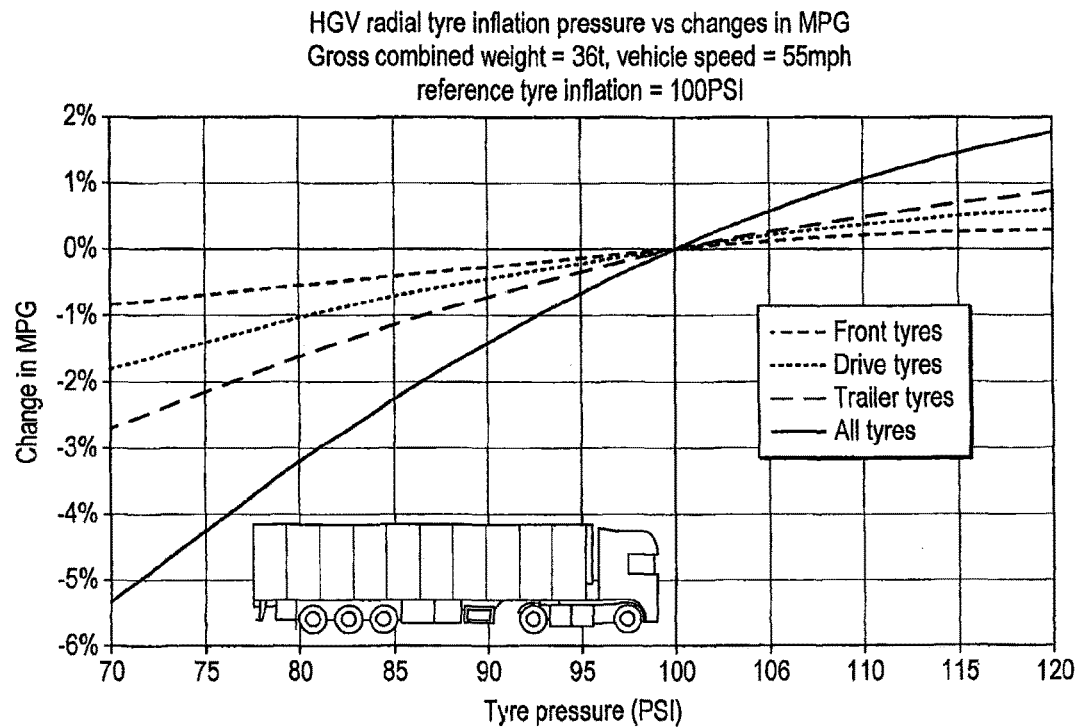
FIG. 2b is a graph showing the change in fuel consumption as a function of tyre pressure.
Figure 2C:
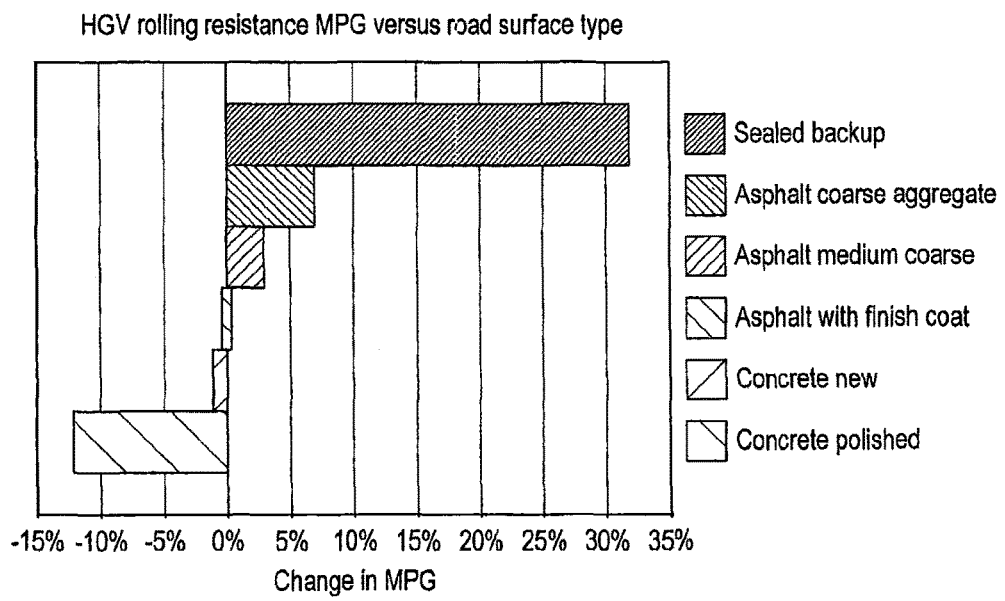
FIG. 2c is a chart showing change in fuel consumption as a function of road surface type.
Figure 2D:
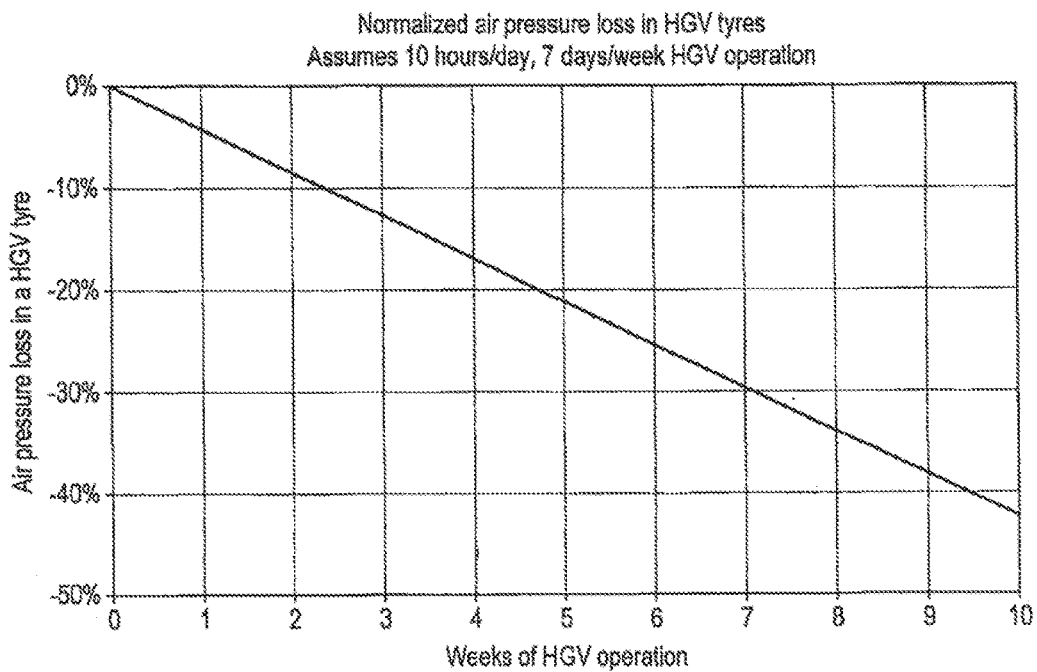
FIG. 2d is a graph showing tyre air pressure loss as a function of time.

FIG. 2a illustrates the significant contribution (circa. 38% @ 55 mph) that rolling resistance makes to the overall power losses experienced in a reference HGV vehicle having a gross weight of 32,000 kg and a maximum power rating of 320 kW. FIG. 2b illustrates the effect that tyre inflation pressure can have on fuel efficiency and, in particular, the extent by which under or over-inflation of tyres at different positions on a reference HGV vehicle can influence its overall fuel efficiency. FIG. 2c shows how various different types of a road surface can influence fuel efficiency. FIG. 2d illustrates the linear relationship between typical air losses in an HGV vehicle tyre over time.

Figure 3:
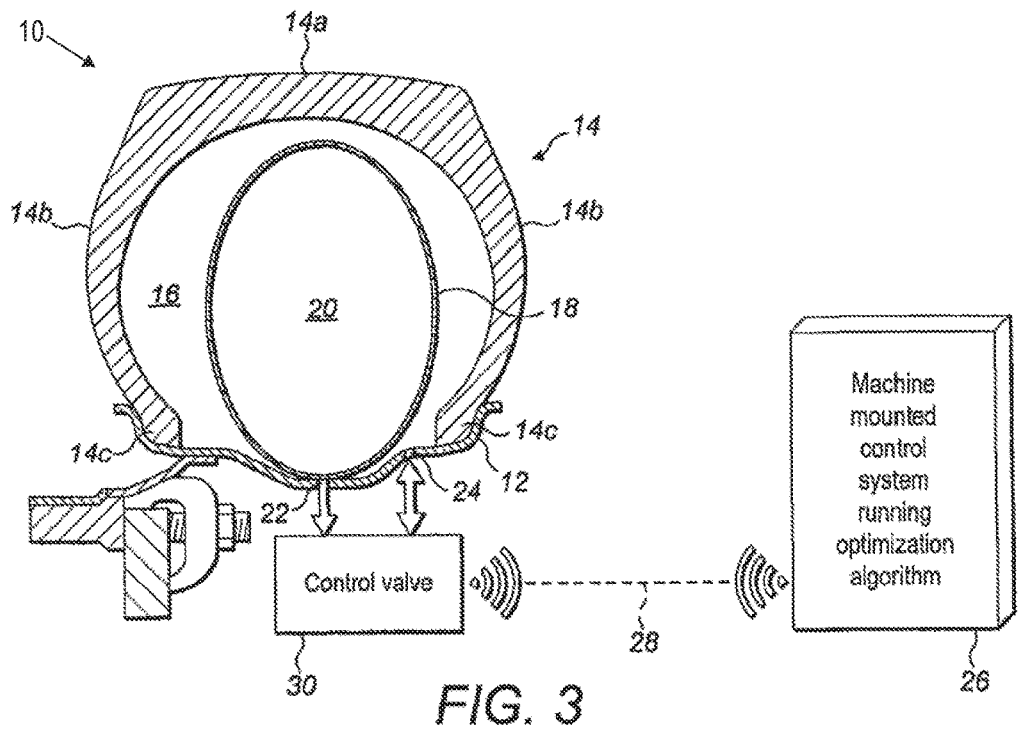
FIG. 3 is a schematic cross-sectional representation of the tyre apparatus according to the present disclosure forming part of the control system of the present disclosure.

FIG. 3 is a cross-sectional schematic representation of the tyre apparatus 10 of the present disclosure connected to a wheel rim 12 of a vehicle (not shown). The tyre apparatus includes a tyre body 14 having a tread portion 14a, two sidewall portions 14b, and two bead portions 14c. The bead portions 14c engage with the wheel rim 12 such that a first inflatable volume 16 is defined between the inner surfaces of the tyre body 14 and the inner surface of the wheel rim 12 between the two bead portions 14c. An inner chamber 18 defining a second inflatable volume 20 is located within the first inflatable volume 16. A first fluid communication path is provided between the first and second inflatable volumes 16, 20. A second fluid communication path is provided between the first inflatable volume 16 and the atmosphere. A first valve 22 is positioned within the first fluid communication path for controlling pressure transfer from the second inflatable volume 20—which is pressurised at a relatively higher pressure—to the first inflatable volume 16. A second valve 24 is provided for controlling pressure transfer from the first inflatable volume 16 to the atmosphere. The first and second valves 22, 24 are each controlled by a valve controller 30 which receives pressure transfer output signals from a tyre pressure control system 26 on a vehicle, as described further below. The pressure transfer output signals may be received via a wireless link 28.

The material structure of the inner chamber 18 is selected such that its tensile strength, and hence its pressure-containing capacity, is greater than that of the material structure of the tyre body 14. In one embodiment, the inner chamber 18 is manufactured from aromatic polyamide (aramid) fibre such as Kevlar® fibre. It will be appreciated that the tensile strength of Kevlar® fibre is significantly higher than that of the rubber compounds found in vehicle tyres. Alternative materials for the inner chamber 18 may include alumino-borosilicate glass (E-glass), alumino silicate glass (S-glass), carbon fibre, Dyneema® fibre, Zylon® fibre etc. The higher tensile strength material of the inner chamber 18 means that it is capable of being inflated to relatively higher pressures than the surrounding tyre body 14, typically an order of magnitude greater. A further advantage of Kevlar® fibre is that the inner chamber 18 can provide for run-flat protection in the event of a catastrophic failure of the tyre body 14.

The tyre apparatus of the present disclosure may form part of a bespoke tyre/rim system. Alternatively, the tyre apparatus of the present disclosure may be retrofittable to existing vehicle tyres/rims. For example, in one non-limiting example a second aperture may be formed in the wheel rim 12 through which the additional valve 22 from the inner chamber 18 extends. In an alternative non-limiting example the existing single aperture formed in the wheel rim 12 may accommodate concentrically arranged first and second valves 22, 24 which communicate with the inner chamber 18 and the tyre body 14 respectively.

Figure 4:
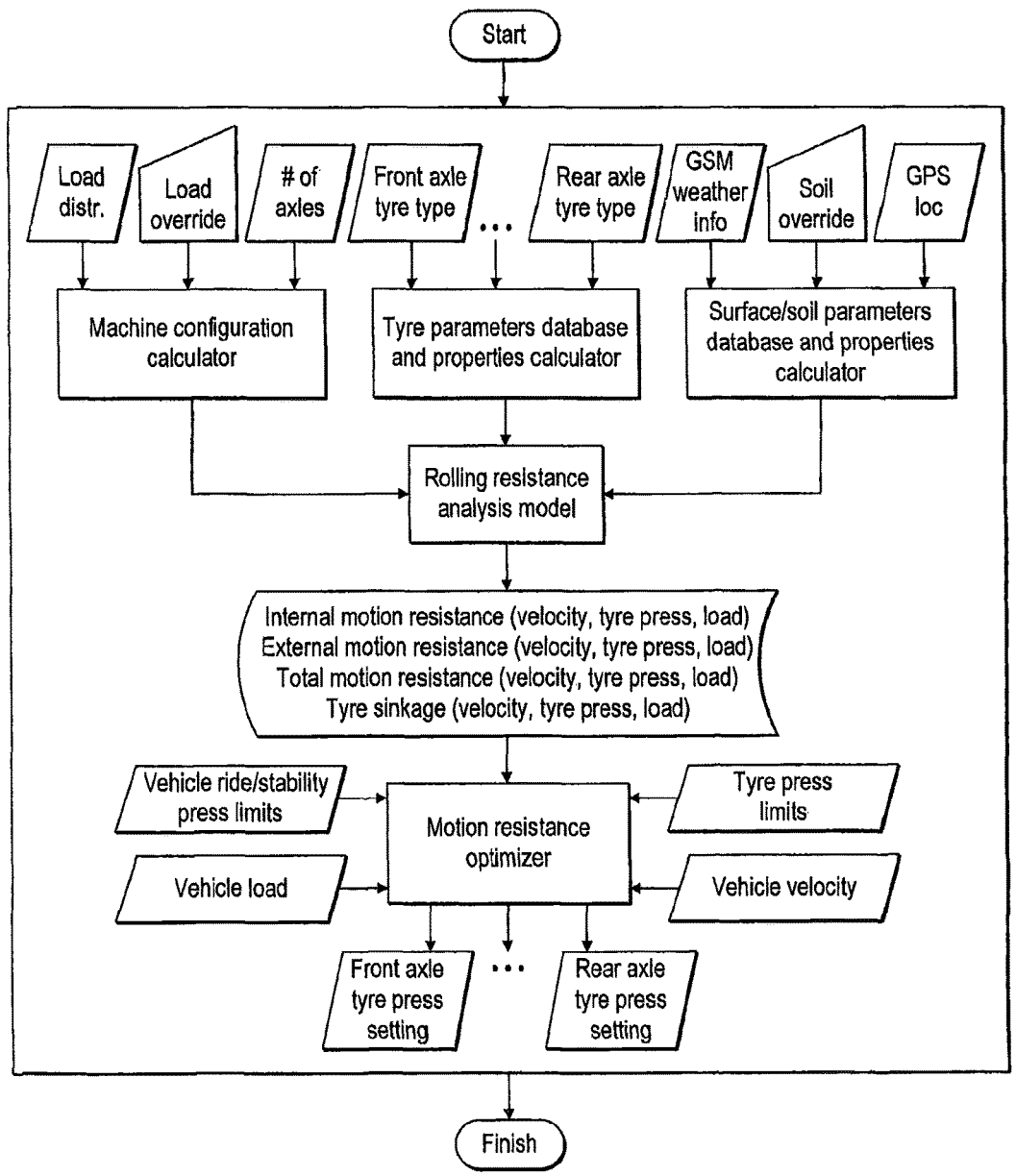
FIG. 4 is a flow chart setting out the basic process operation steps implemented by the algorithm and control system.

In use, the tyre apparatus of the present disclosure may be used as part of an active tyre pressure control system 26 located on a vehicle for controlling the rolling resistance of its wheels. The control system 26 receives one or more input signals relating to one or more external parameters which may include (but are not limited to) vehicle speed; vehicle load; vehicle configuration; ground surface parameters; tyre parameters; GPS information; GSM information on current weather conditions; and temporal characteristics relating to each vehicle wheel such as time since last tyre change (and hence predicted tyre wear) and/or historical air leakage rates. A multitude of other external parameters may be received by the control system, some of which are indicated in FIG. 4.

The control system 26 algorithmically processes input signals by software means to determine an optimum inflation pressure of the first inflatable volume 16 of each tyre body 14. Pressure transfer output signals are generated by the control system 26 and sent, e.g. via a wireless link 28, to the valve controller 30 associated with each vehicle wheel.

The valve controller 30 opens the first or second valve 22, 24 in order to inflate or deflate the tyre body 14 of each wheel in accordance with the pressure transfer output signal received from the control system 26.

For example, an external parameter such as a change in vehicle load (see FIG. 4) may be detected by appropriate sensors on the vehicle and/or within a wheel. The vehicle load signal is received as an input signal by the control system 26. Algorithmic processing of the input signal calculates an optimum inflation pressure for each first inflatable volume 16 of each tyre body 14 which may be greater or less than the existing inflation pressure. A pressure transfer output signal is sent by the control system 26 to the valve controller 30 associated with each wheel to cause either inflation or deflation of the first inflatable volume 16 of its tyre body 14 based on the calculated optimum inflation pressures.

If, for example, a positive change in vehicle load occurs then the algorithm may calculate that the inflation pressure within the front and/or rear tyre bodies 14 requires to be increased. Whilst the required increase in inflation pressure could be achieved by directly inflating the first inflatable volume 16 of the tyre body 14, the valve controller 30 instead opens the first valve 22 to allow the pressure differential between the first and second inflatable volumes 16, 20 to begin to equalise, i.e. a pressure transfer occurs from the second inflatable volume 20, via the first communication path, to the first inflatable volume 16.

Advantageously, an optimum inflation pressure can be maintained within the first inflatable volume 16 of the tyre body 14 irrespective of normal air losses experienced in the tyre body simply by controlled transfer of inflation pressure from the second inflatable volume of the inner chamber 18. A vehicle wheel incorporating the tyre apparatus of the present disclosure can therefore remain autonomous at the correct inflation pressure for a certain period of time without the need for the first inflatable volume 16 of the tyre body 14 to be directly inflated via its valve 24. The length of time for which the vehicle wheel can remain autonomous is dependent on factors including, but not necessarily limited to: (i) its initial inflation pressure; (ii) the initial inflation pressure, and hence volume, of the inner chamber 18; (iii) the presence of any slow punctures; and (iv) the presence of any ineffective seals around valves 22, 24.

The period of autonomy of a vehicle wheel incorporating the tyre apparatus of the present disclosure can be increased by controlling the volume and pressure ratios between the first and second inflatable volumes.

For example, as the second inflatable volume 20 of the inner chamber 18 is increased, its fluid pressure capacity is also increased. Furthermore, as the volume of the inner chamber 18 is increased, there is a consequent decrease in first inflatable volume 16 within the tyre body. As the first inflatable volume 16 reduces, smaller amounts of pressure transfer from the inner chamber 18 are necessary to effect a given pressure change within it. Conversely, as the first inflatable volume 16 increases, larger amounts of pressure transfer from the inner chamber 18 are necessary to effect the same pressure change within it. Accordingly, by increasing the relative volume ratio between the inner chamber 18 (second inflatable volume 20) and the tyre body 14 (first inflatable volume 16), the period of time for which a vehicle wheel can remain autonomous at the correct inflation pressure is increased. For example, taken to the extreme, in vehicle wheels where only a de minimis amount of tyre wall deflection is anticipated, the first inflatable volume 16 can be very small (i.e. its volume will tend to zero). However, in practice the volume ratio will typically fall within the range of 50% to 80% (i.e. between 1:1 and 4:1) depending upon the tyre application. It is estimated that the volume ratio for HDVs—having low tyre wall deflection—may fall at the higher end of this range, e.g. 65% to 80% (1.86:1 to 4:1); whereas the volume ratio for agricultural (Ag) vehicles—having higher tyre wall deflection—may fall at the lower end of this range, e.g. 50% to 65% (1:1 to 1.86:1).

Similarly, as the maximum inflation pressure of the second inflatable volume 20 of the inner chamber 18 is increased, its capacity to transfer pressure to the first inflatable volume is also increased. Accordingly, increasing the relative maximum pressure ratio between the inner chamber 18 (second inflatable volume 20) and the tyre body 14 (first inflatable volume 16), is another way to increase the period of time for which a vehicle wheel can remain autonomous at the correct inflation pressure. For example, when the inner chamber 18 is constructed from Kevlar® fibre, the pressure ratio for HDVs may be 10:1 (i.e. 70 bar:7 bar); whereas pressure ratio for Ag vehicles may be approximately 20:1 or more (e.g. 70 bar:3.3 bar). For Ag vehicles having a higher tyre wall deflection, it will be appreciated that a higher pressure ratio will compensate for the required lower volume ratio with the result that the overall period of time for which an Ag vehicle wheel can remain autonomous may end up being comparable to that for an HDV.

Although the preferred embodiments of this disclosure have been described herein, improvements and modifications may be incorporated without departing from the scope of the following claims.

The invention claimed is:

1. A tyre apparatus including:
   a tyre body for attachment to a wheel rim to define, when mounted to the wheel rim, a first inflatable volume;
   an inner chamber constructed of an aromatic polyamide fiber and defining a second inflatable volume located within the first inflatable volume of the tyre body, the second inflatable volume being partially located within the tyre body;
   a first fluid communication path between the first and second inflatable volumes;
   a second fluid communication path between the first inflatable volume and the atmosphere;
   a first valve for opening and closing the first fluid communication path; and
   a second valve for opening and closing the second fluid communication path; wherein:
   the tensile strength and pressure-containing capacity of the material structure of the second inflatable volume is greater than that of the tyre first inflatable volume; and
   a first fluid pressure within the first inflatable volume of the tyre body is optimisable by:
      opening the first valve to allow pressure transfer from the second inflatable volume into the tyre body; and/or
      opening the second valve to allow pressure to vent from the tyre body to atmosphere.

2. The tyre apparatus according to claim 1, wherein the second inflatable volume of the inner chamber is capable of being pressurised to at least ten times that of the first inflatable volume of the tyre body.

3. The tyre apparatus according to 1, wherein the inner chamber has a maximum volume which is expandable to fill at least 50% of the total volume of the first inflatable volume of the tyre body.

4. The tyre apparatus according to claim 1, wherein the tyre body includes a ground-engageable tread portion and a pair of sidewall portions extending from either side of the tread portion.

5. The tyre apparatus according to claim 4, wherein each sidewall portion terminates in a bead portion at its end remote from the tread portion, the bead portions being engageable with a wheel rim to define the first inflatable volume having an annular shape.

6. The tyre apparatus according to claim 4, wherein the inner chamber is, in use, spaced from the inner surfaces of the tread portion and sidewall portions of the tyre body.

7. The tyre apparatus of claim 1, wherein the tyre apparatus is mounted to a vehicle wheel including the wheel rim.

8. The tyre apparatus according to claim 7, wherein the inner chamber provides run-flat protection.

9. An active tyre pressure control system for controlling the rolling resistance of a vehicle having one or more vehicle wheels according to claim 7, comprising: a vehicle-mounted control system for generating a pressure transfer output signal; and at least one input signal receivable by the control system based on one or more external parameters;

wherein the control system algorithmically processes the input signals by software means to determine an optimum inflation pressure for the tyre body within each vehicle wheel, and sends appropriate pressure transfer output signals to open the corresponding first and/or second valves until optimum inflation pressures are reached within each tyre body.

10. The active tyre pressure control system according to claim 9, wherein the inflation device is operable whilst the vehicle wheels are in motion.

11. The active tyre pressure control system according to claim 9, wherein the external parameters includes one or more of: vehicle speed; vehicle load; ground surface characteristics; and temporal characteristics relating to each vehicle wheel.

* * * * *